US012591769B2

(12) United States Patent
Bozbey et al.

(10) Patent No.: US 12,591,769 B2
(45) Date of Patent: Mar. 31, 2026

(54) THRESHOLD ADJUSTED NEURON CIRCUIT

(71) Applicant: TOBB EKONOMI VE TEKNOLOJI UNIVERSITESI, Ankara (TR)

(72) Inventors: Ali Bozbey, Ankara (TR); Sasan Razmkhah, Chambery (FR)

( * ) Notice: Subject to any disclaimer, the term of this patent is extended or adjusted under 35 U.S.C. 154(b) by 681 days.

(21) Appl. No.: 18/003,391

(22) PCT Filed: Jun. 18, 2021

(86) PCT No.: PCT/TR2021/050622
§ 371 (c)(1),
(2) Date: Dec. 27, 2022

(87) PCT Pub. No.: WO2022/005430
PCT Pub. Date: Jan. 6, 2022

(65) Prior Publication Data
US 2023/0334302 A1 Oct. 19, 2023

(30) Foreign Application Priority Data
Jun. 29, 2020 (TR) ................................. 2020/10176

(51) Int. Cl.
G06N 3/063 (2023.01)
G06N 3/06 (2006.01)
(52) U.S. Cl.
CPC ................................... G06N 3/063 (2013.01)
(58) Field of Classification Search
CPC ................................ G06N 3/063; G06N 3/06
See application file for complete search history.

(56) References Cited

U.S. PATENT DOCUMENTS 5,625,752 A     4/1997  Swenson
6,501,294 B2*  12/2002  Bernstein ............... G06N 3/063
                                                                   706/41
(Continued)

FOREIGN PATENT DOCUMENTS

CN        105976022 A    9/2016
CN        106849882 A    6/2017
(Continued)

OTHER PUBLICATIONS

Lee et al., "A highly scalable and energy-efficient artificial neuron using an Ovonic Threshold Switch (OTS) featuring the spike-frequency adaptation and chaotic activity", Oct. 19, 2019, arXiv. com, pp. 1-15 (Year: 2019).*
(Continued)

*Primary Examiner* — Paulinho E Smith
(74) *Attorney, Agent, or Firm* — EGBERT, MCDANIEL & SWARTZ, PLLC

(57)     ABSTRACT

A neuron circuit, which electronically applies the working principle of the neurons in human brain, controls an input signal according to a set threshold value, and allows to provide an output signal above the threshold value. The neuron circuit controls an input signal according to a set threshold value and allows for an output signal above the threshold value, for determining the size of the threshold value of the circuit, and has at least one threshold resistor, at least one bias resistor, at least one decaying resistor, and at least one switching unit connected to at least one of these resistors.

21 Claims, 3 Drawing Sheets

(56) References Cited

U.S. PATENT DOCUMENTS

Figure 1:
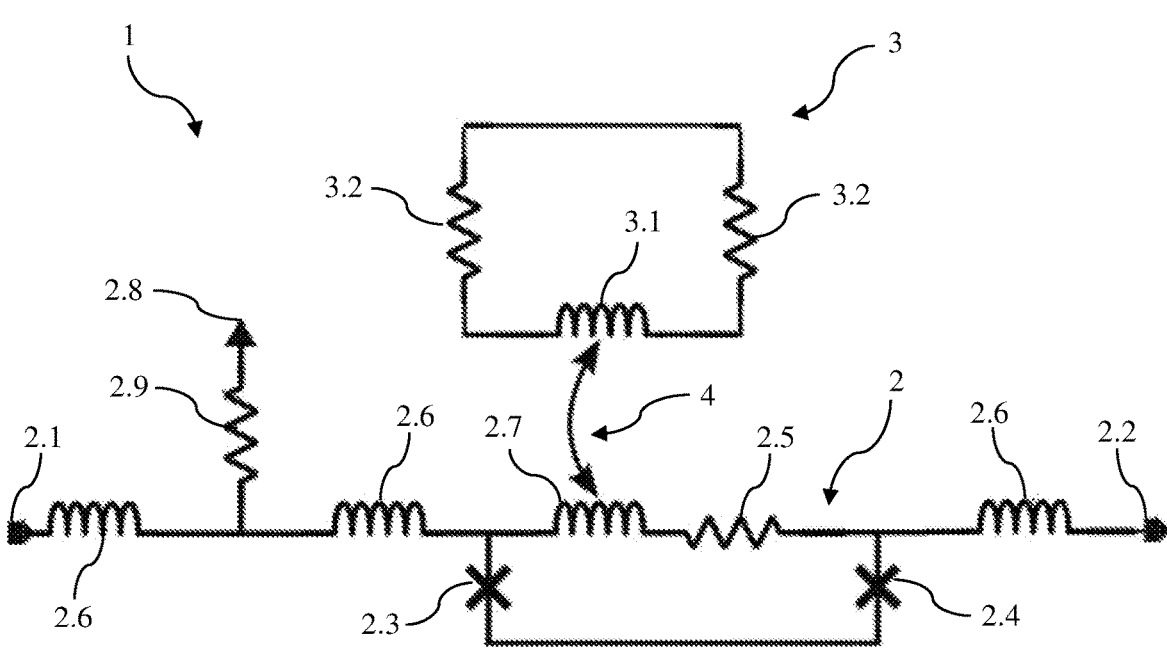

| | | | | |
|---|---|---|---|---|
| 8,589,320 | B2 * | 11/2013 | Breitwisch ............. | G06N 3/065 |
| | | | | 706/15 |
| 11,423,293 | B2 * | 8/2022 | Lee .......................... | G06N 3/04 |
| 11,625,588 | B2 * | 4/2023 | Hou ..................... | G11C 13/004 |
| | | | | 706/41 |
| 2018/0211158 | A1 | 7/2018 | Shainline et al. | |
| 2021/0406651 | A1 * | 12/2021 | Lam ....................... | G06N 3/065 |
| 2023/0274131 | A1 * | 8/2023 | Bozbey ................. | G06N 3/049 |
| | | | | 706/33 |

FOREIGN PATENT DOCUMENTS

| | | | | | |
|---|---|---|---|---|---|
| TR | 201910971 | A2 | 8/2019 | | |
| WO | WO-2020032890 | A2 * | 2/2020 | ............. | G06N 3/065 |
| WO | WO-2020032890 | A3 * | 4/2020 | ........... | G06N 3/0635 |

OTHER PUBLICATIONS

International Search Report for corresponding PCT/TR2021/050622 dated Sep. 28, 2021.
Written Opinion of the International Searching Authority for corresponding PCT/TR2021/050622 dated Sep. 28, 2021.

* cited by examiner

THRESHOLD ADJUSTED NEURON CIRCUIT

TECHNICAL FIELD

The present invention relates to a neuron circuit, which can be controlled by adjusting the threshold value thereof, which electronically applies the working principle of the neurons in human brain, controls an input signal according to a set threshold value, and allows to provide an output signal above the threshold value.

PRIOR ART

Artificial intelligence is the general name given to the work, wherein, upon getting inspired by the behavioral patterns of all of the living creatures in nature, modelling systems that resemble these behaviors are constructed. Artificial intelligence is usually directed at analyzing humans' thinking methods and developing artificial instructions similar to them. In general, artificial intelligence is to enable the behaviors which are identified as intelligent when conducted by humans (intelligent behavior) to be performed by machines, or artificial intelligence is a theory showing how the human mind works. By means of artificial intelligence, it is aimed to make the machines more intelligent and useful. Artificial intelligence provides the machines with a number of functions like thinking, decision making, comparison and analysis such as the ones displayed by humans. Artificial intelligence has many applications such as expert systems, fuzzy logic, artificial neural networks, and genetic algorithms. Artificial neural networks (ANN) are logical software developed to perform, by mimicking the operation mechanism of the human brain, the basic functions of the brain such as learning, remembering and deriving new information by generalization. ANNs are synthetic structures that mimic the biological neural networks. The mimicked nerve cells contain neurons and these neurons connect to each other in various ways to form a network. These networks are capable of learning, storing in memory and revealing the relationship between data. Artificial neural networks are inspired by biological neurons (nerve cells), resulting in artificial simulation of the brain's working system. Artificial neural networks, such as the binding of many biological neurons in the human brain in general terms, are produced for realizing a whole process structure at various levels of activity of many simple and generally adaptive processing units (artificial neurons) which mimic the input, processing, and output characteristics of the biological neuron.

In the current art, artificial neural networks can be evaluated in 3 main categories. The first one is software, the second is semiconductor device based and the last one is superconductor device based. Significant progress has been made in software and semiconductor based artificial neural networks of the first and second categories, particularly in the stages of developing algorithms. But the most important problem of these systems is their slow operation and high-power consumption. Neuron circuits can be designed on software, but since too many algorithms work, the processes are carried out slowly. The problems with superconductor-based artificial nerve cells are that the circuits do not operate reliably, the single flux quantum (SFQ) is not compatible with the digital circuits, and that they are relatively complex structures having large areas. In the electronic application of artificial neural networks, there are integrated structures on the chip and these structures occupy a large area. In the state of the art, artificial neural network application is performed electronically with semiconductors. When the artificial neural networks application is carried out with semiconductors, the size of the neuron circuits is large and in this case they are unpractical. On the other hand, neuron circuits produced by semiconductors consume too much power. Since the neuron circuits consume too much power, the current transmission also slows down. Therefore, the neuron circuits produced by semiconductors work slowly. In this case, the semiconducting neuron circuits cannot keep up with the brain in terms of the processing power. On the other hand, it is not possible in the state of the art to integrate the neuron circuits to each other and to work with the circuits that enable to produce the input. Furthermore, the neuron circuits provided in the current art cannot operate compatibly with the other logic gates (AND/OR, etc.) and are unable to receive and process the signal generated by the standard gates. When producing the neuron circuits, there is a need for a low-power structure that conducts faster than semiconductors.

In another technique in the state of the art, software is developed for a normally used processor via computer modeling. Calculations are conducted on the written program. Software-based artificial neural networks are not efficient due to their slow operation. In the current art, there is a need for a neuron circuit which is capable of conducting the operation of the neurons in the human brain in exactly the same manner or in a similar way, will provide a more rapid transmission with a semiconducting external material, and can be used together with other integrated electronic circuits.

U.S. Pat. No. 5,625,752A, an application in the state of the art, with a priority date of 17 Jun. 1994, discloses an artificial neuron circuit. In the study discussed in the said document, the differential voltage input is constructed with a structure connectable to equal resistors. Equal resistors are used to define weights of the voltage outputs and conducting links are formed for voltage transitions. The invention of the said document discloses a circuit constructed by using conductive materials and resistors. The neuron circuit disclosed in the invention of the present application comprises two loops wherein one enables to adjust the threshold value and the other enables decaying. The said loops are made of a superconducting material. There are insulating junctions on the loop that enables to adjust the threshold value. In the present invention, there is provided a resistor on the loop which enables to adjust the threshold value. The said resistor contributes to the adjustment of the output time of the signal entering the loop when the threshold value is being adjusted. Additionally, threshold value adjustment can be made by means of the decaying loop.

Chinese patent document no. CN105976022A, an application in the state of the art, with a priority date of 27 Apr. 2016, discloses an artificial neuron circuit. In the study of the said document, two parallel signal lines are used one of which is utilized as reference. The current synapse operation is enabled to be simulated by means of an alterable resistor. The said state of the art document discloses a circuit construction which allows adjustment of resistance. The neuron circuit disclosed in the invention of the present application comprises two loops wherein one enables to adjust the threshold value and the other enables decaying. The said loops are made of a superconducting material. The cited document does not indicate that the circuit is made of a superconducting material. There are insulating junctions on the loop that enables to adjust the threshold value. In the present invention, there is provided a resistor on the loop which enables to adjust the threshold value. The said resistor contributes to the adjustment of the output time of the signal entering the loop when the threshold value is being adjusted. Additionally, threshold value adjustment can be made by means of the decaying loop.

Chinese patent document no. CN106849882A, an application in the state of the art, with a priority date of 23 Jan. 2017, discloses an ultra-band low-noise artificial circuit. The amplifier used in the study of the said document is composed of a variable resistor and n number of sequentially arranged semiconductors. The variable resistor optimizes the operation band range and noise level of the circuit. The invention disclosed in the said document has the features of variable resistor, use of conductive structures and ability to change the operation frequency settings by adjustment of resistance. The neuron circuit disclosed in the invention of the present application comprises two loops wherein one enables to adjust the threshold value and the other enables decaying. The said loops are made of a superconducting material. The cited document does not indicate that the circuit is made of a superconducting material. There are insulating junctions on the loop that enables to adjust the threshold value. In the present invention, there is provided a resistor on the loop which enables to adjust the threshold value. The said resistor contributes to the adjustment of the output time of the signal entering the loop when the threshold value is being adjusted. Additionally, threshold value adjustment can be made by means of the decaying loop.

The neuron circuit of the present invention, inspired by the principle of operation of the neural structure in the brain, is produced in order to achieve results faster than the existing structures. The neuron circuit of the present application is the circuit capable of generating the operating principle of the brain electronically. The said neuron circuits are produced from a superconducting material which provides rapid transmission with low power consumption. As the neuron circuits are made of superconductors, the circuit size decreases. The neuron circuit of the present application can operate compatibly with the standard logic gates (AND/ OR) that provide the input. In this case, the said neuron circuits can receive and process the signal produced by the standard logic gates. The neuron circuits can be integrated to each other and arranged successively. The outputs of the neuron circuits of the present invention are also compatible with the standard gates and other neuron circuits. Also, in the present invention, the threshold value of the neuron circuit can be changed by adjusting the resistors via switching. However, in the state of the art, there is no explanation regarding the technical features and the technical effects provided by the invention of the present application.

OBJECTS OF THE INVENTION

An object of the present invention is to provide an artificial neuron circuit which simulates the neuron structure in the brain and is able to produce the operating principle of the brain electronically.

Another object of the present invention is to provide a neuron circuit which reduces the area used by the large-scale integrated circuits on the chip and which is capable of utilizing the calculation speed and power parallel to the neurons in the brain nervous system.

Another object of the present invention is to realize a neuron circuit that enables the threshold value to be adjusted and the threshold values to be changed and controlled.

A further object of the present invention is to provide a neuron circuit which, thanks to the fact that it is made of a superconducting material, provides rapid transmission with low power consumption.

BRIEF DESCRIPTION OF THE INVENTION

A neuron circuit, which is developed to fulfill the objects of the present invention and defined in the first claim and the other claims dependent thereon is comprised of a decaying loop and a decaying threshold coupling. The threshold loop and the decaying loop provided in the neuron circuit are superconducting. The signal is input to the threshold loop through the signal input. The threshold resistor is used when the signal entering into the threshold loop is preferred to be completely decayed. The current passing through the threshold resistor decays. The first junction and the second junction are used when the signal entering into the threshold loop is preferred to be stored. Signals coming from the signal input at regular intervals are stored in the threshold loop by the first junction and the second junction. If the signal stored in the threshold loop reaches the threshold value, it is output through the signal output. The time of the output signal is adjusted by the decaying loop. The decaying loop and the threshold loop are coupled to each other by means of magnetic interaction and via the decaying threshold coupling. By changing the coupling factor of the decaying loop with the threshold loop, the time of the output signal and the threshold value can be adjusted.

The threshold value of the neuron circuit according to the invention can also be set by means of at least one switching unit.

In an embodiment of the invention, said switching unit is connected to more than one bias resistors of different values and/or more than one threshold resistors of different values and/or more than one decaying resistors of different values; and the threshold resistor, decaying resistor, or bias resistor of desired value can be selected by controlling the switching unit, and thus the threshold value of the neuron circuit can be changed.

In another embodiment of the present invention, a switching unit is connected to each bias resistor in neuron circuits connected to each other and having different threshold values, and a signal output can be received from this neuron circuit by opening and closing these switching units, providing current passage through the desired neuron circuit. Thus, only the neuron circuit with the desired threshold value can be output.

In an embodiment of the invention, in neuron circuits with different threshold values connected in parallel to each other, at least one switching unit is connected to one end of each threshold resistor and/or bias resistor and/or decaying resistor or on a conductor line on which these resistors are found, and this switching unit is switched on and off so as to ensure that the circuit is in conduction state or an open circuit. Thus, while no output is taken from the neuron circuit that does not have the desired threshold value, an output can be obtained from the neuron circuit with the desired threshold value.

In another embodiment of the present invention, a switching unit is connected to each bias resistor found in neuron circuits connected in parallel to each other and having different threshold values, and it is kept closed (in conduction state) by this switch. A D-flipflop is connected to the signal output of each of these neuron circuits. In order to receive a signal from the neuron circuit with the desired threshold value, the D-flipflop connected to the desired neuron circuit is triggered with a clock pulse signal, and the pulse signal at the input of the D-flipflop is output as it is from its output. Thus, only the neuron circuit with the desired threshold value can be output.

DETAILED DESCRIPTION OF THE INVENTION

The neuron circuit developed to fulfill the objects of the present invention is illustrated in the accompanying figures, in which:

FIG. 1. is a schematic view of the neuron circuit.

Figure 2:
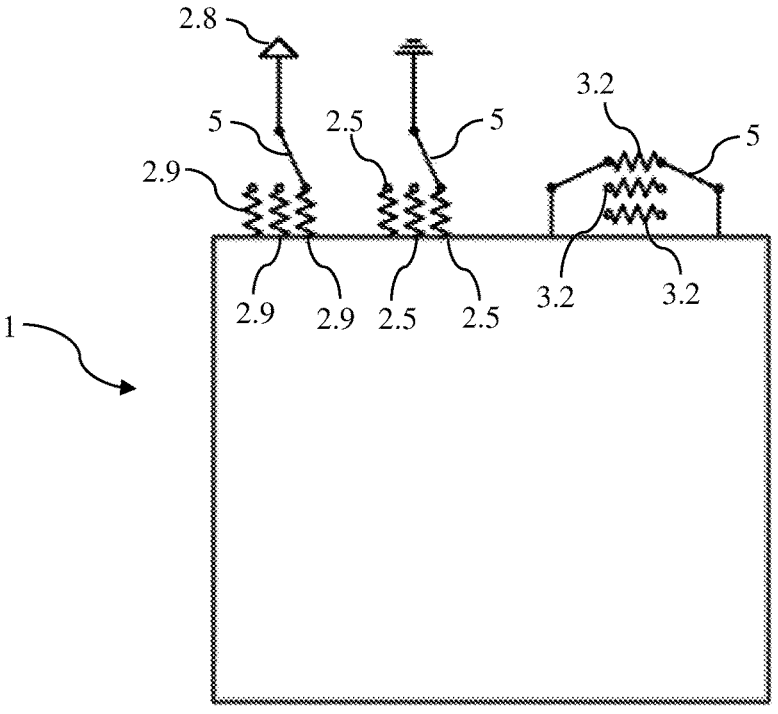

FIG. 2. is a schematic view of the neuron circuit comprising the switching unit.

Figure 3:
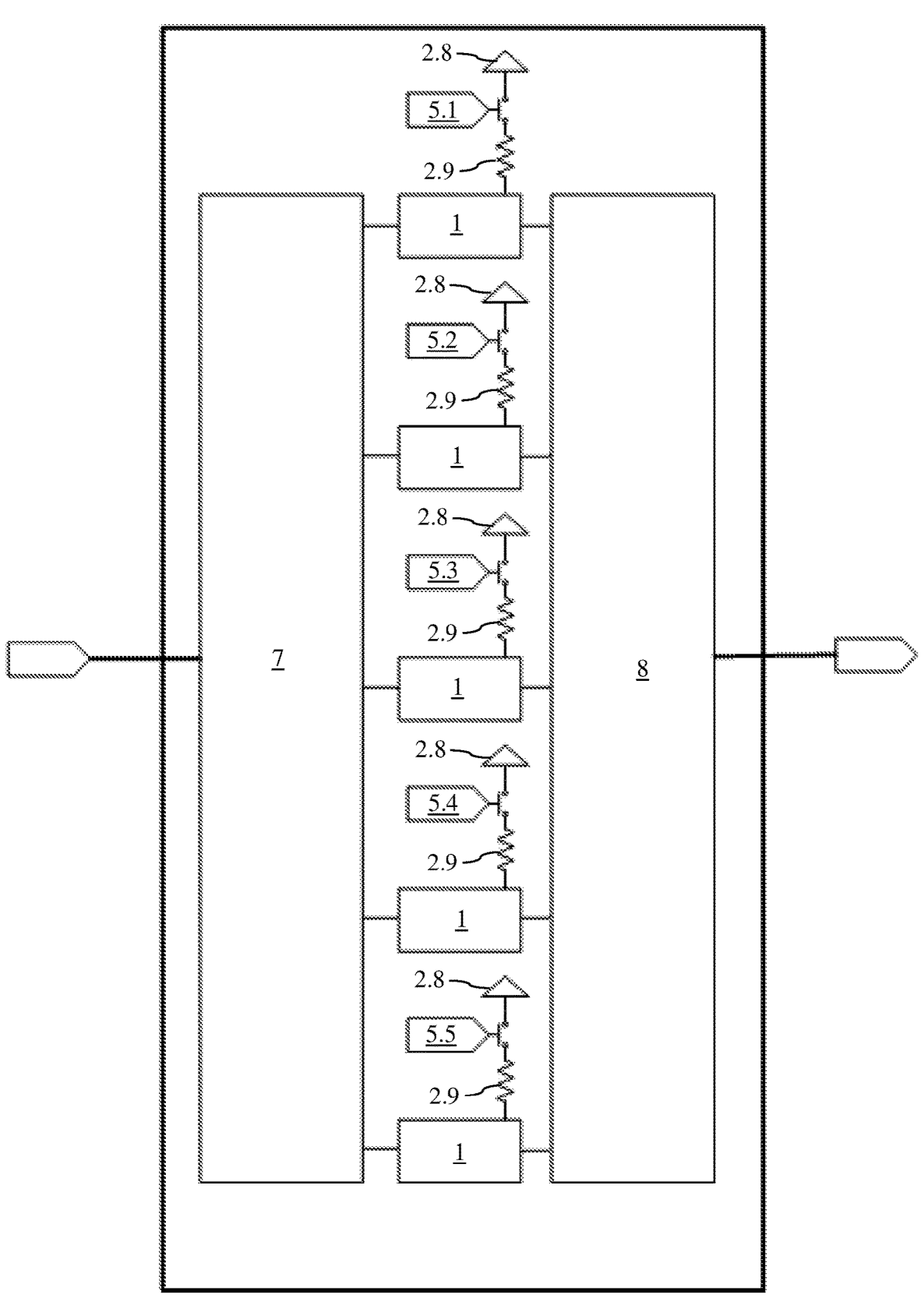

FIG. 3. is a schematic view of the neuron circuits with different threshold values connected in parallel to each other and the switching units connected to these neuron circuits.

Figure 4:
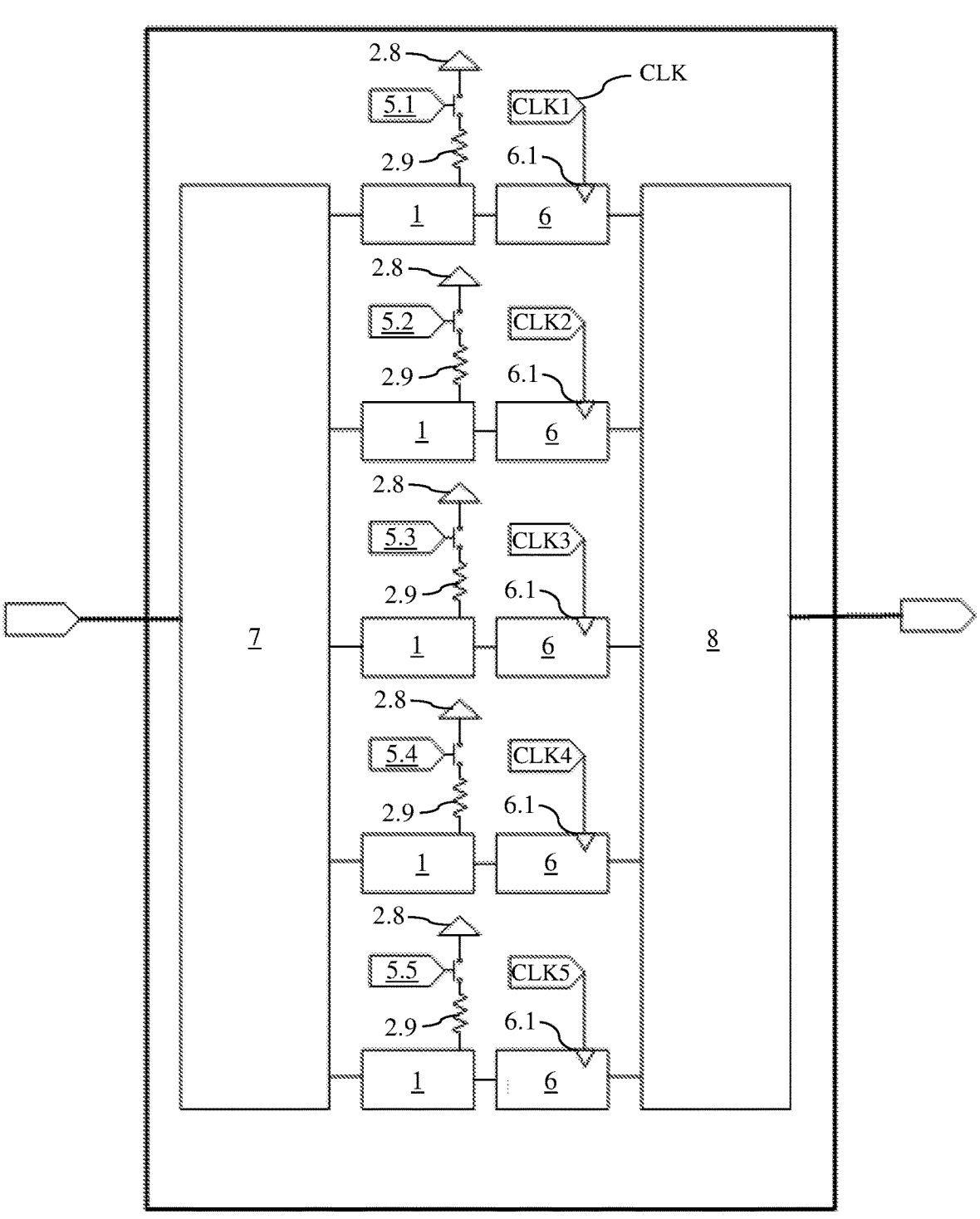

FIG. 4. is a schematic view of the neuron circuits in FIG. 3 and the D-flipflops connected to these neuron circuits.

The components given in the figures are enumerated individually, and the meanings of these numbers are given below.

1. Neuron circuit
2. Threshold loop
   2.1. Signal input
   2.2. Signal output
   2.3. First junction
   2.4. Second junction
   2.5. Threshold resistor
   2.6. Threshold side inductor
   2.7. Threshold side coupled inductor
   2.8. Bias input
   2.9. Bias resistor
3. Decaying loop
   3.1. Decaying side coupled inductor
   3.2. Decaying resistor
4. Decaying threshold coupling
5. Switching unit
   5.1. First switching unit
   5.2. Second switching unit
   5.3. Third switching unit
   5.4. Fourth switching unit
   5.5. Fifth switching unit
6. D-flipflop
   6.1. Clock pulse input
7. Splitter
8. Merger
CLK. Clock pulse signal
CLK1. First clock pulse signal
CLK2. Second clock pulse signal
CLK3. Third clock pulse signal
CLK4. Fourth clock pulse signal
CLK5. Fifth clock pulse signal A neuron circuit (1), which controls an input signal according to a set threshold value, the threshold value of which can be changed and adjusted, which enables to output an output signal above the threshold value, and which is superconducting, in its most basic form, comprises:

at least one threshold loop (2), comprising at least one signal input (2.1), at least one signal output (2.2), at least one first junction (2.3), at least one second junction (2.4), at least one threshold resistor (2.5), at least one threshold side coupled inductor (2.7), a bias input (2.8), and at least one bias resistor (2.9) connected to the bias input (2.8), which is superconducting, receiving the input signal to be processed from the signal input (2.1), decaying the said signal according to the threshold value or enabling the output of the signal through the signal output (2.2), and repeating the same process for each new signal;

at least one first junction (2.3) and at least one second junction (2.4) which are insulators and which enable the signal to remain within the threshold loop (2) between the signal input (2.1) and the signal output (2.2) until it reaches the threshold value;

at least one decaying loop (3), which has at least one decaying side coupling inductor (3.1) and at least one decaying resistor (3.2), and which is superconducting and upon being integrated with the threshold loop (2), enables to determine the threshold value of the signal in the threshold loop (2);

at least one decaying side coupled inductor (3.1), which is coupled to the threshold side coupled inductor (2.7) provided on the threshold loop (2) via the decaying threshold coupling (4), and which enables to determine the threshold value of the signal in the threshold loop (2) with the effect of the coupling factor between itself and the threshold side coupled inductor (2.7) and the magnetic fields they create, at least one switching unit (5) connected to at least one bias resistor (2.9) and/or more than one threshold resistors (2.5) of different values and/or more than one decaying resistors (3.2) of different values.

The neuron circuit (1) of the present application is capable of generating the operating principle of the brain electronically and simulating operation of the neural network structure. The neuron circuit (1) comprises a superconducting threshold loop (2) and a decaying loop (3). The threshold loop (2) and the decaying loop (3) are coupled to each other magnetically. The magnetic coupling between the threshold loop (2) and the decaying loop (3) is provided by means of the decaying threshold coupling (4). The signal incoming to the neuron circuit (1) is processed or decayed by the threshold loop (2). The threshold value of the signal processed in the threshold loop (2) is adjusted and it can be decayed by the decaying loop (3). The neuron circuit (1) controls an input signal according to a set threshold value by mimicking the neural structure in the brain and enables to emit an output signal above the threshold value. The neuron circuit (1) can be operated in integration with other neuron circuits (1). At the same time, the neuron circuit (1) of the present invention works in accordance with the standard logic gates and receives signal input from and delivers signal output to the standard logic gates.

The threshold loop (2) in the neuron circuit (1) of one embodiment of the invention enables to store or decay the incoming signal. The signals circulating on the threshold loop (2) work like the ions in the brain. The threshold loop (2) comprises a signal input (2.1), a signal output (2.2), a first junction (2.3), a second junction (2.4), a threshold resistor (2.5), a threshold side inductor (2.6), a threshold side coupled inductor (2.7), a bias input (2.8), and at least one bias resistor (2.9). The threshold loop (2) is superconducting. The threshold loop (2) receives the signal to be processed from the signal input (2.1). The threshold loop (2) decays the said signal relative to the threshold value or supplies the output of the signal through the signal output (2.2). The threshold loop (2) repeats the same process for each new signal. Signal is input to the threshold loop (2) via the signal input (2.1). The signal input (2.1) can be connected to the circuit component that produces the signal preferred to enter into the threshold loop (2). The signal input (2.1) enables the signal to enter into the threshold loop (2). The signal entering into the threshold loop (2) through the signal input (2.1) is stored and also decayed in the threshold loop (2). When the signal is preferred to be stored in the threshold loop (2), the signal is output from the threshold loop (2) through the signal output (2.2).

The first junction (2.3) and the second junction (2.4) provided in the threshold loop (2) of one embodiment of the invention are insulator. The first junction (2.3) and the second junction (2.4) enable the signal to remain within the threshold loop (2) between the signal input (2.1) and the signal output (2.2) until it reaches the threshold value. The first junction (2.3) and the second junction (2.4) are located in the threshold loop (2) preferably opposite and parallel to each other (FIG. 2). The first junction (2.3) and the second junction (2.4) are located in the threshold loop (2) between the signal input (2.1) and the signal output (2.2). The first junction (2.3) and the second junction (2.4) are within the loop that forms a signal loop in the threshold loop (2). There is a loop in the threshold loop (2) in order for the signal to remain between the signal input (2.1) and the signal output (2.2). The first junction (2.3) and the second junction (2.4) are located in the said loop.

When the signal incoming to the threshold loop (2) through the signal input (2.1) exceeds the threshold value, the first junction (2.3) and the second junction (2.4) enable the signal to be transformed into an output signal and they determine the amplitude of the signal in the threshold loop (2) and the number of signals incoming to the threshold loop (2). When the signal incoming to the threshold loop (2) through the signal input (2.1) exceeds the threshold value when it reaches the first junction (2.3) and the second junction (2.4), the signal is output through the signal output (2.2) whereby it is transformed into an output signal. In this embodiment of the invention, when there is no threshold resistor (2.5) and threshold side inductor (2.6) on the threshold loop (2), the first junction (2.3) and the second junction (2.4) continue processing the signal in an endless loop until it reaches the preferred threshold value. If the signal incoming to the threshold loop (2) is lower than the preferred threshold value, it enters into the loop in the threshold loop (2) and passes over the first junction (2.3) and the second junction (2.4). If the signal incoming to the threshold loop (2) is higher than the preferred threshold value, it is output from the threshold loop (2). The signal incoming to the threshold loop (2) starts to circulate (moves in a loop). When the signal is circulating within the threshold loop (2), a part of it is decayed by the first junction (2.3) and the second junction (2.4). When the same signal continues to circulate within the threshold loop (2), signals continue to successively come to through the signal input (2.1). This way, the signals are stored in the threshold loop (2). If the signals exceed the preferred threshold value, they are output through the signal output (2.2) as output signal. The number and threshold value of the signal incoming to the threshold loop (2) can be determined by means of the first junction (2.3) and the second junction (2.4). Additionally, the first junction (2.3) and the second junction (2.4) enable to adjust the number of signals required to exceed the threshold value.

In one embodiment of the invention, the threshold resistor (2.5) provided in the threshold loop (2) enables to decay or attenuate the signal. The threshold resistor (2.5) carries out current limiting by providing a resistance against the current acting thereon. In this case, the threshold resistor (2.5) limits the signal in the threshold loop (2), thereby enabling to decay it or attenuate energy of the signal. The threshold resistor (2.5) is used when the signal entering into the threshold loop (2) is preferred to be completely decayed. The threshold resistor (2.5) enables the signal in the threshold loop (2) to behave according to the preferred threshold value. The preferred threshold value of the threshold loop (2) is adjusted by the threshold resistor (2.5). The threshold value is increased or decreased by increasing or decreasing the value of the threshold resistor (2.5). By means of the threshold value, it is determined on which threshold value the signal incoming to the threshold loop (2) will be output, in other words, after which threshold value an output signal will be generated at the signal output (2.2). Signal decaying should be carried out for the threshold value adjustment of the threshold loop (2). Additionally, the threshold resistor (2.5) also enables to adjust the storage times of the signal(s) that will be stored in the threshold loop (2). When the input signal enters the threshold loop (2), it is stored in the threshold loop (2). The threshold resistor (2.5) decreases storage of the signal stored in the threshold loop (2) preferably gradually. The threshold resistor (2.5) enables to store the signal in the threshold loop (2) such that it is decayed in time. When the threshold resistor (2.5) decays the signal and continues to store it, the first junction (2.3) and the second junction (2.4) ensure that the signal remains in the threshold loop (2) until it reaches the threshold value.

In one embodiment of the invention, the threshold side inductor (2.6) provided in the threshold loop (2) provides the signal transmission on the superconducting threshold loop (2). The threshold side inductor (2.6), similar to the threshold resistor (2.5), enables to adjust the decaying time and storage time of the signal on the threshold loop (2). The threshold side inductor (2.6) is operated so as to store current therein. The threshold side inductor (2.6), similar to the threshold resistor (2.5), also enable to adjust the storage times of the signal(s) that will be stored in the threshold loop (2). While signal transmission is carried out by means of the threshold side inductor (2.6), the signal is decayed and continued to be stored by means of the threshold resistor (2.5). The first junction (2.3) and the second junction (2.4) enable the signal to circulate in a loop during decaying and storage thereof until it reaches the threshold value in the threshold loop (2). The threshold value is determined by means of the decaying loop (3).

In one embodiment of the invention, the threshold side coupled inductor (2.7) provided in the threshold loop (2) provides the coupling between the threshold loop (2) and the decaying loop (3). The threshold loop (2) and the decaying loop (3) are coupled to each other magnetically. The magnetic coupling of the threshold loop (2) to the decaying loop (3) is provided by means of the threshold side coupled inductor (2.7).

In one embodiment of the invention, the bias input (2.8) provided in the threshold loop (2) enables continuous supply. The said bias input (2.8) is preferably connected to a voltage source, and at least one bias resistor (2.9) is connected to this bias input (2.8). The bias input (2.8) provides the energy required for operation of the threshold loop (2). The bias input (2.8) supplies the threshold loop (2) with direct current (DC). The first junction (2.3) and the second junction (2.4) provided in the threshold loop (2) are powered by direct current supply. In this case, upon activating the bias input (2.8), direct current is supplied to the threshold loop (2) to enable operation of the first junction (2.3) and the second junction (2.4). The bias input (2.8) also ensures that the threshold value remains at the desired level. The bias input (2.8) preferably works under a transistor-like current. In this embodiment of the present invention, when a signal arrives on the threshold loop (2), the bias input (2.8) enables the first and second junctions in the loop to be operated by being opened and closed.

The decaying loop (3) in the neuron circuit (1) of one embodiment of the present invention is magnetically coupled to the threshold loop (2). The decaying loop (3) adjusts the level of timing of the output time of the signal input to the threshold loop (2). The decaying loop (3) can adjust the output time and timing of the signal input in accordance with the coupling factor between itself and the threshold loop (2). The decaying loop (3) comprises a decaying side coupled inductor (3.1) and a decaying resistor (3.2). The decaying loop (3) is superconducting. The decaying loop (3) is integrated to the threshold loop (2) to enable determining the threshold value of the signal in the threshold loop (2). The decaying loop (3) enables the signal in the threshold loop (2) to be decayed or the threshold value to be adjusted. The decaying loop (3) carries out the process of decaying the signal in the threshold loop (2). One or more decaying resistors (3.2) may be provided on the decaying loop (3). The decaying resistor (3.2) enables the signal decaying. The decaying resistor (3.2) provided in the decaying loop (3) carries out the process of decaying by enabling to decay the signal in the threshold loop (2) to which it is magnetically coupled. Upon adjustment of the coupling factor between the decaying loop (3) and the threshold loop (2) at a sufficient level, current is generated on the decaying loop (3) due to the magnetic field. The current generated on the decaying loop (3) decreases as it passes over the decaying resistor (3.2). As the current in the decaying loop (3) decreases, the magnetic field decreases as well and the current is converted to heat. The decaying resistor (3.2) provided in the decaying loop (3) carries out the threshold value adjustment of the signal in the threshold loop (2). As the decaying resistor (3.2) increases, the threshold value of the signal in the threshold loop (2) increases. In this case, if the decaying resistor (3.2) increases, the threshold value increases as well since more signals are needed.

The decaying side coupled inductor (3.1) provided in decaying loop (3) in one embodiment of the invention is connected to the threshold side coupled inductor located (2.7) on the threshold loop (2) via the decaying threshold coupling (4). The decaying side coupled inductor (3.1) and threshold side coupled inductor (2.7) enable to determine the threshold value of the signal in the threshold loop (2) by the effect of the coupling factor between themselves and the magnetic fields they generate.

In one embodiment of the invention, the decaying threshold coupling (4) provided in the neuron circuit (1) provides the connection between the threshold loop (2) and the decaying loop (3). The threshold loop (2) and the decaying loop (3) are coupled to each other magnetically. The magnetic coupling between the threshold loop (2) and the decaying loop (3) is provided by means of the decaying threshold coupling (4). The threshold side coupled inductor (2.7) in the threshold loop (2) and the decaying side coupled inductor (3.1) in the decaying loop (3) are arranged such that they will be affected by each other's magnetic field. In this case, when the threshold loop (2) is in fixed position, the position of the decaying loop (3) can be adjusted such that the magnetic field generated by the decaying side coupled inductor (3.1) is affected by the magnetic field generated by the threshold side coupled inductor (2.7). The magnetic field generated by the decaying side coupled inductor (3.1) and the magnetic field generated by the threshold side coupled inductor (2.7) can trigger each other. The coupling factor between the threshold loop (2) and the decaying loop (3) is changed depending on the magnetic field generated by the decaying side coupled inductor (3.1) and the magnetic field generated by the threshold side coupled inductor (2.7). The threshold value of the signal in the threshold loop (2) can be adjusted by changing the coupling factor between the decaying loop (3) and the threshold loop (2).

In one embodiment of the invention, when the coupling factor between the decaying loop (3) and the threshold loop (2) is decreased, the threshold value of the signal in the threshold loop (2) is decreased. When the coupling factor between the decaying loop (3) and the threshold loop (2) is increased, the decaying side coupled inductor (3.1) is maximum affected by the magnetic field of the threshold side coupled inductor (2.7). When the decaying side coupled inductor (3.1) is maximum affected by the magnetic field of the threshold side coupled inductor (2.7), decaying of the signal current stored in the threshold loop (2) increases. Upon reaching the threshold value with the new incoming signals during the decaying, the signal is output through the signal output (2.2).

In one embodiment of the invention, when the coupling factor between the decaying loop (3) and the threshold loop (2) is increased, the threshold value of the signal in the threshold loop (2) is increased. When the coupling factor between the decaying loop (3) and the threshold loop (2) is decreased, the decaying side coupled inductor (3.1) is minimally affected from the magnetic field of the threshold coupling inductor (2.7). When the decaying side coupled inductor (3.1) is minimally affected by the magnetic field of the threshold side coupled inductor (2.7), decaying of the signal current stored in the threshold loop (2) slows down, and when it reaches the threshold value by means of the new incoming signal(s), it is output through the signal output (2.2).

Use of the neuron circuit (1) provided in this embodiment of the invention is performed as follows: The threshold loop (2) and the decaying loop (3) provided in the neuron circuit (1) are superconducting. The signal is input to the threshold loop (2) through the signal input (2.1). The threshold resistor (2.5) is used when the signal entering into the threshold loop (2) is preferred to be completely decayed. The current passing through the threshold resistor (2.5) is decayed. The first junction (2.3) and the second junction (2.4) are used when the signal entering into the threshold loop (2) is preferred to be stored. The signals coming from the signal input (2.1) at regular intervals are stored in the threshold loop (2) by the first junction (2.3) and the second junction (2.4). If the signal stored in the threshold loop (2) reaches the threshold value, it is output through the signal output (2.2). The time of the output signal is adjusted by the decaying loop (3). The decaying loop (3) and the threshold loop (2) are coupled to each other by means of magnetic interaction via the decaying threshold coupling (4). By changing the coupling factor of the decaying loop (3) with the threshold loop (2), the time of the output signal and the threshold value can be adjusted.

The threshold value of the neuron circuit (1) of the present invention can also be changed by means of a switching unit (5). The way to adjust the threshold value of the neuron circuit (1) explained in detail in the above paragraphs by means of the said switching unit (5) is explained separately in the preferred embodiments of the invention given below, and some of these embodiments are shown in FIG. 2, FIG. 3, and FIG. 4.

In a preferred embodiment of the invention shown in FIG. 2, more than one threshold resistors (2.5) of different values and/or more than one bias resistors (2.9) of different values and/or more than one decaying resistors (2.8) of different values are found in the same neuron circuit (1), and these can be switched separately by means of switching units (5). In other words, in an embodiment of the invention, more than one threshold resistors (2.5) and more than one bias resistors (2.9) are found in the same neuron circuit (1), and a switching unit (5) is connected to these more than one threshold resistors (2.5) and another switching unit (5) is connected to these more than one bias resistors (2.9). In an embodiment of the invention, more than one threshold resistors (2.5) and more than one decaying resistors (3.2) are found in the same neuron circuit (1), and a switching unit (5) is connected to these more than one threshold resistors (2.5) and another switching unit (5) is connected to these more than one decaying resistors (3.2). In an embodiment of the invention, more than one bias resistors (2.9) and more than one decaying resistors (3.2) are found in the same neuron circuit (1), and a switching unit (5) is connected to these more than one bias resistors (2.9) and another switching unit (5) is connected to these more than one decaying resistors (3.2). In another embodiment of the invention, more than one threshold resistors (2.5), more than one bias resistors (2.9), and more than one decaying resistors (3.2) are found in the same neuron circuit (1), and a switching unit (5) is connected to these more than one threshold resistors (2.5), another switching unit (5) is connected to these more than one bias resistors (2.9), and another switching unit (5) is connected to these more than one decaying resistors (3.2). The resistors selected by the said switching units (5) determine the threshold value of the neuron circuit (1). Thus, the neuron circuits (1) with the desired threshold value can be obtained by means of at least one switching unit (5).

In some embodiments of the invention, the said switching unit (5) can be connected only to more than one threshold resistors (2.5) or only to more than one bias resistors (2.9) or only to more than one decaying resistors (3.2). These other embodiments of the invention are described below.

In a preferred embodiment of the invention, there are more than one threshold resistors (2.5) with different values in the neuron circuit (1). A switching unit (5) can be connected to at least one end of the said threshold resistors (2.5), and the switching unit (5) can be controlled to enable switching in order to select the desired threshold resistance (2.5). While the current flows over the selected threshold resistor (2.5), no current can flow through the other threshold resistors (2.5). Therefore, the threshold value of the neuron circuit (1) changes according to the selected resistance. Thus, the neuron circuit (1) can have different threshold values by switching the threshold resistances (2.5) of different values. Similar situation is valid for other resistors in other embodiments of the invention, and these embodiments are explained below.

In another preferred embodiment of the invention, there are more than one bias resistors (2.9) with different values in the neuron circuit (1). A switching unit (5) can be connected to at least one end of the said bias resistors (2.9), and the switching unit (5) can be controlled and switched in order to select the desired bias resistor (2.9). While current flows over the selected bias resistor (2.9), no current can flow through the other bias resistors (2.9). Therefore, the threshold value of the neuron circuit (1) changes according to the selected resistance. Thus, the neuron circuit (1) can have different threshold values with different bias resistors (2.9).

In another preferred embodiment of the invention, there are more than one decaying resistors (3.2) with different values in the neuron circuit (1). At least one end of the said decaying resistors (3.2) can be connected to a switching unit (5), and switching is ensured by controlling the said switching unit (5) in order to select the desired decaying resistor (3.2). While current flows over the selected decaying resistor (3.2), no current can flow through other decaying resistors (3.2). Therefore, the threshold value of the neuron circuit (1) changes according to the selected resistance. Thus, the neuron circuit (1) can have different threshold values with different decaying resistors (3.2).

In another preferred embodiment of the invention shown in FIG. 3, the neuron circuits (1) with different threshold values are connected in parallel to each other. The signal inputs (2.1) of these neuron circuits (1) are connected to a splitter (7), and the signal outputs (2.2) to a merger (8). The said splitter (7) and merger (8) are standard known circuits. The splitter (7) comprises an input and more than one outputs, and multiplexes (increases the number of) a pulse signal (for example, a pulse signal at the output of an artificial synapse circuit) that it takes from the input, and outputs the same to its more than one outputs. Thus, the same pulse signal at the input of the splitter (7) is taken from each output and fed separately to the input of each neuron circuit (1). The merger (8), on the other hand, contains multiple inputs and a single output, and the clock pulses coming to the inputs of the merger (8) connected to the output of each neuron circuit (1) are merged/summed up and given to the output of the merger (8). In this embodiment of the invention, at least one switching unit (5) is used that is connected to one end (preferably between the bias input (2.8) and the bias resistor (2.9)) of each bias resistor (2.9) of the said neuron circuit (1). For example, a first switching unit (5.1) is connected to the first neuron circuit (1), a second switching unit (5.2) is connected to the second neuron circuit (1), a third switching unit (5.3) is connected to the third neuron circuit (1), a fourth switching unit (5.4) is connected to the fourth neuron circuit (1), and a fifth switching unit (5.5) is connected to the fifth neuron circuit (1). However, the invention is not limited to five neuron circuits (1) and five switching units (5), and these numbers are given as an example in this invention and may vary according to various embodiments. The passage of the current flowing from the bias input (2.9) to the neuron circuit (1) is controlled by opening and closing the said at least one switching unit (5). When the current flows from the closed switching units (5), in other words from the switching units (5) in conducting state, the neuron circuit (1) connected to this switching unit (5) becomes active. Since the current passage is prevented by the switch units (5) that are open, in other words, by the switching units (5) that are not in transmission, the neuron circuits (1) to which these open switching units (5) are connected will be inactive. Therefore, by opening and closing the relevant switching units (5), the neuron circuit (1) with the desired threshold value can be activated and the pulse signal output of this activated neuron circuit (1) is fed to one of the inputs of the merger (8).

In an embodiment of the invention, the switching units (5) in FIG. 2 and the switching units (5) in FIG. 3 can be used in the same neuron circuit (1). In other words, one switching unit (5) can be connected to each bias resistor (2.9) in the neuron circuits (1) connected to each other in parallel, more than one threshold resistor (2.5) with different values, and more than one decaying resistors (3.2) with different values.

In an embodiment of the invention, at least one switching unit (5) can be connected to one end of the threshold resistor (2.5) and/or bias resistor (2.9) and/or decaying resistor (3.2) shown in FIG. 1 (on at least one conductive line on which at least one of these resistors are found), and thus when one of these switching units (5) is opened, as current will not flow through the neuron circuit (1), output from this neuron circuit would be avoided.

In another preferred embodiment of the invention shown in FIG. 4, a standard D-flipflop (6) is connected to the outputs of each of the above said neuron circuits (1). D-flipflops (6) comprise a clock pulse input (6.1) to be triggered by a pulse signal input, a pulse signal output and a clock pulse signal (CLK). When the said D-flipflops (6) are triggered by receiving a clock pulse signal (CLK) from the clock pulse input (6.1), it outputs the same pulse signal from its output as a pulse signal. In this embodiment of the present invention, all the switching units (5) of all the neuron circuits (1) that are connected in parallel to each other and have different threshold values are kept in closed state, or in other words, in conducting state. By applying a clock pulse signal (CLK) to the clock pulse input (6.1) of the D-flipflop (6) connected to the signal output (2.2) of the neuron circuit (1) whose output is desired to be received among the outputs of these neuron circuits (1), the said D-flipflop (6) is triggered and thus the signal at the input of the D-flipflop (6) is directly transmitted to the output of the D-flipflop (6). For example, if the pulse signal at the signal output (2.2) of the first neuron circuit (1) is desired to be taken, a first pulse signal (CLK1) is applied to the clock pulse input (6.1) of the first D-flipflop (6) connected to this first neuron circuit (1), if the pulse signal at the signal output (2.2) of the second neuron circuit (1) is desired to be taken, a second pulse signal (CLK2) is applied to the clock pulse input (6.1) of the second D-flipflop (6) connected to this second neuron circuit (1), if the pulse signal at the signal output (2.2) of the third neuron circuit (1) is desired to be taken, a third pulse signal (CLK3) is applied to the clock pulse input (6.1) of the third D-flipflop (6) connected to this third neuron circuit (1), if the pulse signal at the signal output (2.2) of the fourth neuron circuit (1) is desired to be taken, a fourth pulse signal (CLK4) is applied to the clock pulse input (6.1) of the fourth D-flipflop (6) connected to this fourth neuron circuit (1), if the pulse signal at the signal output (2.2) of the fifth neuron circuit (1) is desired to be taken, a fifth pulse signal (CLK5) is applied to the clock pulse input (6.1) of the fifth D-flipflop (6) connected to this fifth neuron circuit (1). Thus, the output of the neuron circuit (1) having the desired threshold value is fed to the merger (8) to be used. The number of said D-flipflops (6) is not limited to the number mentioned here, and these numbers may vary in different applications.

The invention claimed is:

1. A neuron circuit that controls an input signal according to a set threshold value, the set threshold value being changeable and adjustable, the neuron circuit outputting an output signal above the set threshold value, the neuron circuit being superconducting, the neuron circuit comprising:

at least one threshold loop having at least one signal input and at least one signal output and at least one first junction and at least one second junction and at least one threshold resistor and at least one threshold side coupled inductor and a bias input and at least one bias connected to the bias input so as to receive the input signal processed from the at least one signal input so as to decay the signal according to the set threshold value or enabling the output of the signal through the at least one signal output and repeating for each new signal, the at least one first junction and the at least one second junction enabling the signal to remain within the at least one threshold loop between the at least one signal input and the at least one signal output until the signal reaches the threshold value, the at least one first junction and the at least one second junction being insulators;

at least one decaying loop having at least one decaying side coupling inductor and at least one decaying resistor, said at least one decaying loop being superconducting and integrated with said at least one threshold loop so as to determine the threshold value of the signal in the at least one threshold loop, the at least one decaying side coupling inductor being coupled to the at least one decaying side coupling inductor on said at least one threshold loop via a decaying threshold coupling so as to determine the threshold value of the signal in said at least one threshold loop as a result of a distance between said at least one decaying side coupling inductor and the at least one threshold side coupled inductor and the magnetic fields thereof; and at least one switching unit connected to the at least one bias resistor or the at least one threshold resistor or the at least one decaying resistor, wherein the neuron circuit comprises more than one neuron circuit that have different threshold values and are connected in parallel to each other.

2. The neuron circuit of claim 1, wherein said at least one threshold loop has the at least one threshold resistor and the at least one threshold side coupled inductor and the bias input so as to receive the signal to be processed from the at least one signal input and stores the signal entering through the at least one signal input.

3. The neuron circuit of claim 2, wherein the at least one threshold resistor enables current limiting by providing resistance against a current acting thereon and enable the signal to reach a desired threshold value, the at least one threshold resistor limits and decays the signal in said at least one threshold loop.

4. The neuron circuit of claim 2, wherein the at least one threshold resistor reduces the signal in said at least one threshold loop so as to store the signal while decaying over time, the at least one threshold resistor enabling an adjusting of a time of decay of the signal stored in said at least one threshold loop.

5. The neuron circuit of claim 2, wherein the at least one threshold side coupled inductor provides a signal transmission to said at least one threshold loop and enables an adjusting of time of decay of the signal in said at least one threshold loop and a time of keeping the signal in the neuron circuit, the at least one threshold side coupled inductor storing a current therein and provides a signal transmission on said at least one threshold loop.

6. The neuron circuit of claim 2, wherein the bias input provides a continuous supply of power required for energizing said at least one threshold loop so as to ensure that the signal remains at the threshold value, the bias input supplying said at least one threshold loop with direct current.

7. The neuron circuit of claim 1, wherein the at least one signal input is connected to a circuit component that produces the signal that enters into said at least one threshold loop.

8. The neuron circuit of claim 1, wherein the at least one first junction and the at least one second junction enable the signal to be transformed into the output signal when the signal enters int the at least one threshold loop through the at least one signal input and determines an amplitude of the signal in the at least one threshold loop and the number of signals incoming to the at least one threshold loop.

9. The neuron circuit of claim 1, wherein the at least one first junction and the at least one second junction enable the signal incoming through the at least one signal input to be stored in a persistent loop until reaching a desired threshold value when there is no at least one threshold resistor and the at least one threshold side coupled inductor on said at least one threshold loop.

10. The neuron circuit of claim 1, wherein at least one decaying loop is magnetically coupled to said at least one threshold loop, said at least one decaying loop adjusting an output time and a storage duration of the signal input in accordance with a coupling factor between said at least one decaying loop and said at least one threshold loop and is integrated to said at least one threshold loop in order to determine the threshold value of the signal in said at least one threshold loop.

11. The neuron circuit of claim 10, wherein an increase in the coupling factor between said at least one decaying loop and said at least one threshold loop generates a current due to a magnetic field enables the generated current to decrease when passing over the at least one decaying resistor.

12. The neuron circuit of claim 1, wherein said at least one decaying loop enables an adjustment of the threshold value of the signal in said at least one threshold loop and increases a required number of signals when the threshold value is increased.

13. The neuron circuit of claim 1, wherein the at least one decaying side coupling inductor and the at least one threshold side coupled inductor in said at least one threshold loop are mutually affected by respective magnetic fields.

14. The neuron circuit of claim 1, wherein said at least one decaying loop reduces the threshold value of said at least one threshold loop when a coupling factor between said at least one decaying loop and said at least one threshold loop is reduced.

15. The neuron circuit of claim 1, wherein said at least one decaying loop increases the threshold value of said at least one threshold loop when a coupling factor between said at least one decaying loop and said at least one threshold loop is increased.

16. The neuron circuit of claim 1, wherein the at least one decaying side coupling inductor is affected by a magnetic field of the at least one threshold side coupled inductor so as to accelerate a decaying of a signal current stored in said at least one threshold loop.

17. The neuron circuit of claim 1, wherein the at least one signal input is connected to at least one output of a splitter.

18. The neuron circuit of claim 1, wherein the at least one signal output is connected to at least one input of a merger.

19. The neuron circuit of claim 1, wherein said at least one switching unit is connected between the at least one threshold resistor and the bias input in each neuron circuit.

20. The neuron circuit of claim 1, further comprising:
a plurality of D-flip flops connected to the at least one signal output of each neuron circuit, each of said plurality of D-flip flops having an input and an output and a clock pulse input that is triggered by a clock pulse signal.

21. A neuron circuit that controls an input signal according to a set threshold value, the set threshold value being changeable and adjustable, the neuron circuit outputting an output signal above the set threshold value, the neuron circuit being superconducting, the neuron circuit comprising:
at least one threshold loop having at least one signal input and at least one signal output and at least one first junction and at least one second junction and at least one threshold resistor and at least one threshold side coupled inductor and a bias input and at least one bias connected to the bias input so as to receive the input signal processed from the at least one signal input so as to decay the signal according to the set threshold value or enabling the output of the signal through the at least one signal output and repeating for each new signal, the at least one first junction and the at least one second junction enabling the signal to remain within the at least one threshold loop between the at least one signal input and the at least one signal output until the signal reaches the threshold value, the at least one first junction and the at least one second junction being insulators;
at least one decaying loop having at least one decaying side coupling inductor and at least one decaying resistor, said at least one decaying loop being superconducting and integrated with said at least one threshold loop so as to determine the threshold value of the signal in the at least one threshold loop, the at least one decaying side coupling inductor being coupled to the at least one decaying side coupling inductor on said at least one threshold loop via a decaying threshold coupling so as to determine the threshold value of the signal in said at least one threshold loop as a result of a distance between said at least one decaying side coupling inductor and the at least one threshold side coupled inductor and the magnetic fields thereof; and
at least one switching unit connected to the at least one bias resistor or the at least one threshold resistor or the at least one decaying resistor, wherein said at least one switching unit is adapted to switch between a plurality of threshold resistors or between a plurality of bias resistors or between a plurality of decaying resistors.

* * * * *